United States Patent [19]

Falk

[11] 3,848,704
[45] Nov. 19, 1974

[54] PARKING BRAKE AND WEAR ADJUSTMENT MEANS
[75] Inventor: Edward J. Falk, St. Louis, Mo.
[73] Assignee: Wagner Electric Corporation, Parsippany, N.J.
[22] Filed: Nov. 19, 1973
[21] Appl. No.: 417,251

[52] U.S. Cl............ 188/71.8, 188/72.6, 188/106 F, 188/196 R, 188/196 V
[51] Int. Cl............................................ F16d 65/52
[58] Field of Search..... 188/71.8, 72.6, 72.9, 106 F, 188/196 V, 196 R; 192/111 A

[56] References Cited
UNITED STATES PATENTS

| | | | |
|---|---|---|---|
| 1,274,865 | 8/1918 | Everett | 188/196 V |
| 3,337,008 | 8/1967 | Trachte | 188/106 F |
| 3,459,282 | 8/1969 | Hoenick et al. | 188/106 F |
| 3,610,375 | 10/1971 | Gilliland et al. | 188/71.8 X |
| 3,701,399 | 10/1972 | Airheart | 188/71.8 |

Primary Examiner—George E. A. Halvosa

[57] ABSTRACT

A parking brake includes a wear compensating device for a disc brake assembly. An outer housing is adapted for mounting on the disc brake assembly. An actuating piston is movably mounted within the outer housing for movement relative thereto. An actuating device is mounted on the housing to engage the actuating piston and to apply a force thereto to move the piston relative to the housing. An adjusting stem is mounted within the actuating piston and provided to receive the force applied to the actuating piston by the actuating device and to transmit that force to the disc brake assembly. A plurality of radially expandable rings in relatively stacked relationship are provided within the actuating piston forming a passageway therethrough for accommodating the adjusting stem and for compensating for wear resulting from use of the disk brake assembly by permitting axial displacement of the adjusting stem relative to the actuating piston.

18 Claims, 9 Drawing Figures

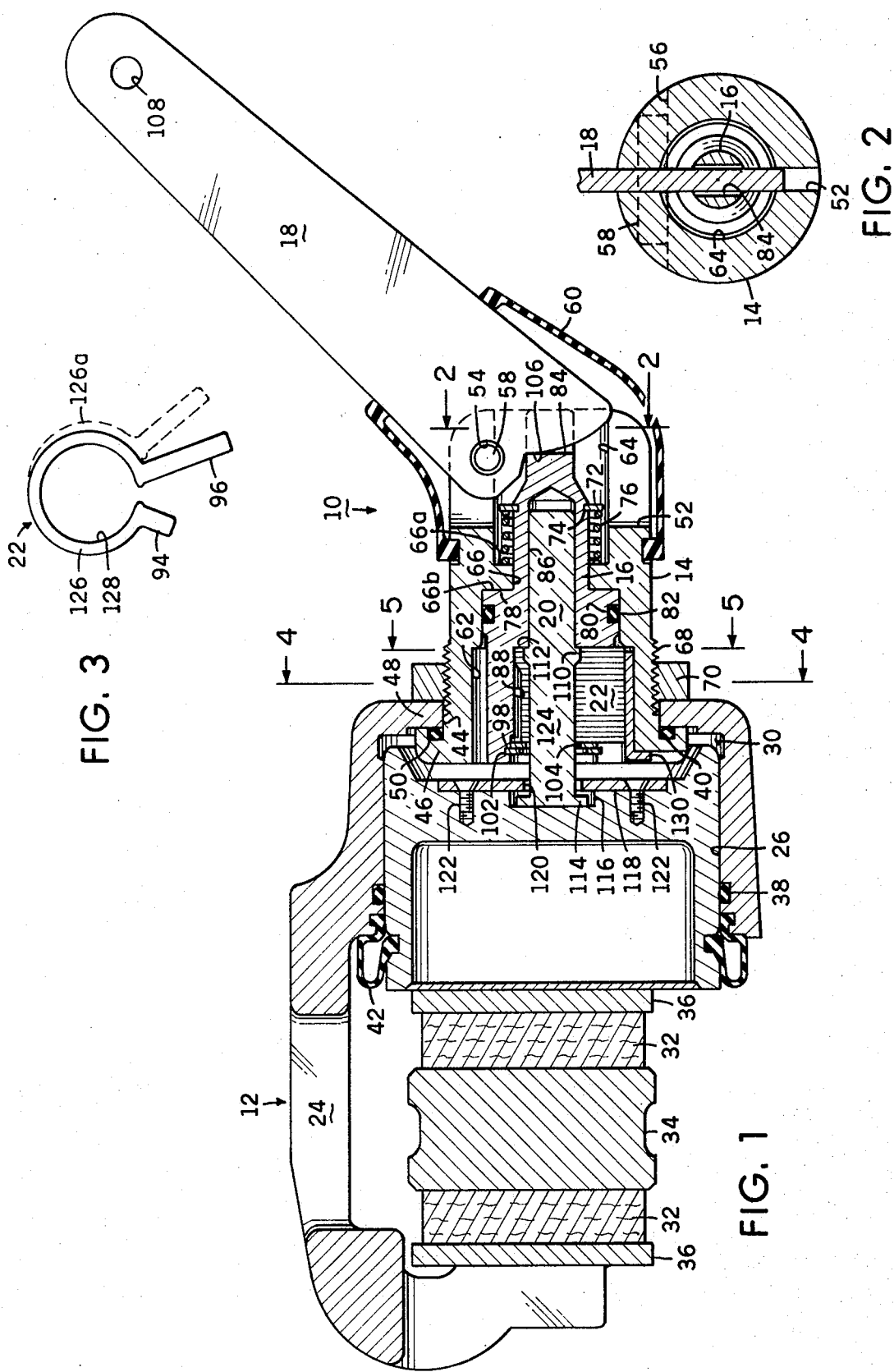

PARKING BRAKE AND WEAR ADJUSTMENT MEANS

BACKGROUND OF THE INVENTION

1. Field of the Invention

This invention relates generally to parking brakes and more specifically to those parking brakes including wear adjustment means.

2. Description of the Prior Art

Generally, parking brakes have included wear adjustment or wear compensating devices which depended upon a nut and bolt type arrangement or similar arrangement including an advancing threaded member. The advancement of the threaded member compensates for wear of the brake pad lining material due to repeated engagement of the pad with a rotating disc or the like. Also, a stack of tapered washers has been used to effect a step-by-step adjustment to compensate for wear. The washers are engaged by an annular elastic retainer. The retainer provides an adequate progressive adjustment by sequentially engaging the washers as they advance through the retainer.

A problem in heretofore known wear adjustment or wear compensating devices was the requirement of a clutch-type mechanism to prevent back rotating of the advancing threaded adjustment means.

Another problem associated with such devices is in resetting the adjustment mechanism for re-use when the old brake pads are sufficiently worn so as to require replacement. Obviously, when new pads are installed there is no need for the adjustment compensated for due to the relationship of the adjuster means and the worn pads. Thus, it would be advantageous to provide a wear compensating means for a parking brake which adequately provided progressive adjustment capabilities within a range of adjustment and which also facilitated the resetting of the adjustment device without the need for extensive disassembly requirements and without the need for a clutch-type mechanism.

SUMMARY OF THE INVENTION

Accordingly, the present invention includes a parking brake which adequately provides progressive adjustment capabilities desired and which also facilitates resetting of the adjustment device without requiring extensive disassembly of the parking brake device and without requiring a clutch-type mechanism.

The foregoing is accomplished by providing an outer housing adapted for mounting, for example, on a disc brake assembly. An actuating piston is movably mounted within the outer housing for relative movement therewith. An actuating means is mounted on the housing to engage the actuating piston and to apply a force thereto to move the piston relative to the housing. An adjusting stem is mounted within the actuating piston and provided to receive the force applied to the actuating piston by the actuating means and to transmit that force to the disc brake assembly. A plurality of expandable rings in relatively stacked relationship are positioned within the actuating piston forming a passageway therethrough for accommodating the adjusting stem and for compensating for wear resulting from the use of the disc brake assembly by permitting axial displacement of the adjusting stem relative to the actuating piston. Also, when it is desired to reset the adjustment means as when new brake pads are installed, it is not necessary to substantially disassemble the parking brake assembly since the stack of expandable rings may be repositioned by an operation performed without removing the outer housing.

Other objects, advantages and novel features of the invention will become apparent from the following detailed description when considered in conjunction with the accompanying drawings. It is to be expressly understood, however, that the drawings are not intended as a definition of the invention but are for the purposes of illustration only.

BRIEF DESCRIPTION OF THE DRAWINGS

In the drawings wherein like parts are marked alike:

FIG. 1 is a cross-sectional side elevation of the parking brake of this invention mounted for use with a caliper disc brake;

FIG. 2 is a cross-sectional view taken along the line 2—2 of FIG. 1;

FIG. 3 illustrates the radially expandable ring of the wear adjustment portion of this invention;

DESCRIPTION OF THE PREFERRED EMBODIMENT

Figure 4:
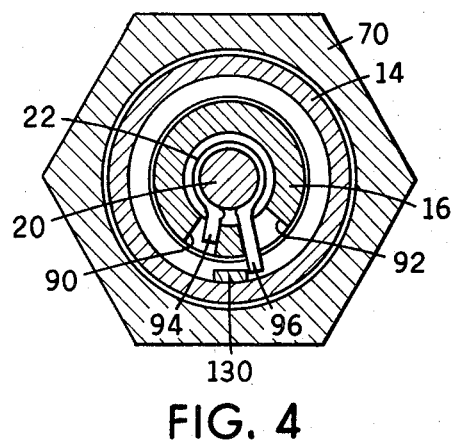
FIG. 4 is a cross-sectional view taken along the line 4—4 of FIG. 1.

Referring to the drawings, FIG. 1 illustrates a parking brake assembly generally designated 10 including a wear compensating device for a disc brake assembly generally designated 12. An outer housing 14 is adapted for and is mounted on disc brake assembly 12. Actuating piston 16 is movably mounted within outer housing 14 for relative movement therewith. An actuating means such as lever 18 is mounted on housing 14 for relative movement therewith to engage actuating piston 16 and to apply a force thereto to move piston 16 relative to housing 14. Adjusting stem 20 is mounted within actuating piston 16 and is provided to receive the force applied to piston 16 by lever 18 and to transmit that force to disc brake assembly 12. A plurality of radially expandable rings 22 are provided within actuating piston 16 in relatively stacked relationship thus forming a passageway through the stacked rings for accommodating adjusting stem 20 and for compensating for wear resulting from the use of disc brake assembly 12 by permitting axial displacement of adjusting stem 20 relative to actuating piston 16 (see illustration at FIGS. 7, 8 and 9).

Caliper disc brake assembly 12 is of the type including caliper 24 having a bore 26 formed therein. Piston 28 is slidably mounted in bore 26 and is hydraulically actuated to slide in the bore when hydraulic fluid is introduced into cavity 30 and exerts a pressure on piston 28. Such pressure urges piston 28 and associated opposed brake pad linings 32 into braking engagement with disc 34. Brake pad linings 32 are preferably mounted on steel brake shoes 36. Resilient O-rings 38, 40 provide seals to limit leakage of the hydraulic fluid from cavity 30. Resilient boot 42 limits the entry of dirt and foreign debris into bore 26.

Outer Housing

Outer housing 14 is preferably of metal and is mounted on caliper 24 by providing bore 44 in the caliper. Thus, housing 14 is inserted through bore 44. Flange 46 of housing 14 may abut shoulder 48 of caliper 24 and annular groove 50 may be provided to accommodate O-ring 40. In this manner, flange 46 is adjacent piston 28 and is in communication with cavity 30. Housing 14 protrudes through bore 44 and extends to the right as viewed in FIG. 1.

At an end of housing 14, opposite flange 46, groove 52 is formed to accommodate lever 18 which is mounted to pivot relative to housing 14. Lever 18 includes opening 54 which may be aligned with opening 56 in housing 14, as when lever 18 is inserted into groove 52. In this manner, pin 58 is inserted into the aligned openings 54, 56 to permit pivotal movement of lever 18 with respect to housing 14, (see also FIG. 2).

Resilient boot 60 is provided to overlap the pivotal connection of lever 18 and housing 14 for the purpose of limiting the entry of dirt and foreign debris into the housing.

Housing 14 includes stepped first bore 62 adjacent flange 46 and second bore 64 adjacent groove 52. Raised annular flange 66 is integratedly formed in housing 14 between first bore 62 and second bore 64. Also, housing 14 may be externally threaded at 68 to accommodate correspondingly threaded hex nut 70. In this manner, housing flange 46 may be firmly urged against caliper shoulder 48 and housing 14 may be firmly secured to the caliper.

Actuating Piston

Actuating piston 16 is preferably of suitable metal and is mounted within outer housing 14 for movement relative thereto. Retainer ring 72 is positioned in annular groove 74 of piston 16. Spring 76 is compressed between shoulder 66a of flange 66 and ring 72. In this manner, piston 16 is urged to the right as viewed in FIG. 1 so as to seat shoulder portion 78 of piston 16 against shoulder 66b of flange 66. Annular groove 80 is provided in the annular periphery of piston 16 to accommodate O-ring 82 against a portion of stepped bore 62 so as to seal against leakage of hydraulic fluid from cavity 30. Groove 84 is formed in piston 16 to accommodate lever 18 (see FIGS. 1 and 2) when groove 84 is aligned with groove 52.

Figure 5:
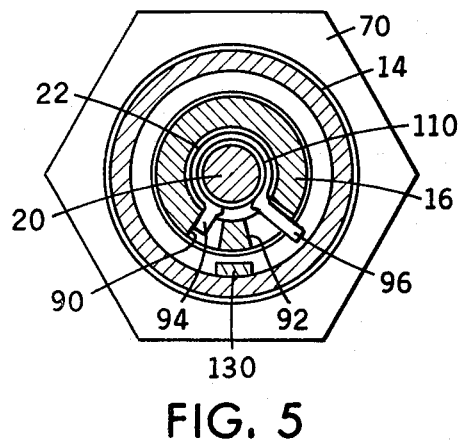
FIG. 5 is a cross-sectional view taken along the line 5—5 of FIG. 1.
Figure 6:
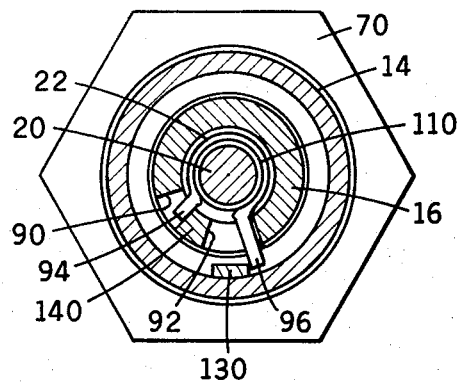
FIG. 6 is a cross-sectional view illustrating rotation of actuating piston and expansion of the rings for resetting the rings in their original position.

Actuating piston 16 includes first bore 86 for receiving a portion of adjusting stem 20. Also, piston 16 includes second bore 88 formed therein for receiving a stacked plurality of rings 22 therein. Actuating piston 16 further includes first and second radially spaced slots 90, 92, respectively, which extend radially outwardly from second bore 88 and terminate externally of piston 16, (see also FIGS. 4, 5 and 6). Slots 90, 92 are separated by portion 140 of piston 16. Slots 90, 92 extend axially along the length of second bore 88 for receiving first and second terminal extensions 94, 96, respectively, of stacked rings 22. Retainer ring 98 is provided in annular groove 102 formed in second bore 88. Washer 84 abuts ring 98 to retain stacked rings 22 in position within second bore 88.

Actuating Means

Rigid actuating means or lever 18 is preferably of suitable metal and is mounted on outer housing 14 for movement relative thereto. Lever 18 is pivotal about the centroidal axis of pin 58. In this manner, lever portion 106 engages piston 16 in groove 84 and applies a force thereto to move piston 16 linearly relative to housing 14. Opening 108 is provided in lever 18 for cable connection to a handle for remotely actuating parking brake 10.

Adjusting Stem

Adjusting stem 20 is mounted within actuating piston 16 and provided to receive the force applied to the actuating piston and to transmit that force to piston 28. The adjusting stem comprises an elongated member having a radially outwardly extending shoulder first portion 110 mounted within piston 16 to receive the force applied to the piston by actuating means 18. Shoulder 110 is engageable by land 112 of piston 16 to permit the force applied to piston 16 to be transmitted to stem 20. A second portion or flange 114 of stem 20 extends into caliper bore 26 for engaging piston 28.

Flange 114 is received in abutting engagement with piston 28 at recess 116. Annular plate 118 having opening 120 therein is secured to piston 28 by screws 122 or the like. Opening 120 is of a smaller diameter than flange 114 to limit the movement of stem 20 with respect to piston 28. An intermediate portion 124 of stem 20 interconnects first and second portions 110, 114, respectively, for transmitting the force applied to shoulder 110 to flange 114 whereby flange 114 applies that force to piston 28 to urge the linings 32 into braking engagement with disc 34.

Radially Expandable Rings

Radially expandable rings 22, preferably steel, provide a means within the actuating piston for compensating for wear resulting from repeated braking engagement of the brake pad linings 32 and disc 34. A plurality of rings 22 are provided in stacked relationship within bore 88 of piston 16. Referring to FIG. 3, ring 22 comprises a generally open ring-like main portion 126 which is resilient to permit radial expansion as shown in phantom at 126a. A plurality of rings 22 form a passageway 128 through main portion 126 which can accommodate intermediate portion 124 of adjusting stem 20. Ring 22 further includes first and second terminal extensions 94, 96, respectively, which extend radially outwardly from open ring portion 126. Extensions 94, 96 are radially spaced from one another as illustrated in FIG. 3, and second extension 96 extends radially outwardly from open ring portion 126 at a greater distance than first extension 94. Key 130 (FIGS. 1, 4, 5 and 6) is fixedly attached within the outer housing 14 for abutment with second terminal extension 96. Rings 22 are substantially resilient for radial expansion to permit shoulder portion 110 of adjusting stem 20 to pass through passageway 128 formed by a stack of rings 22.

OPERATION

Repeated braking operations on the brake pedal by the vehicle operator cause hydraulic pressure to flood cavity 30 and urge piston 28 and its associated brake linings 32 into engagement with disc 34. As piston 28 moves to the left as viewed in FIG. 1, stem 20 is urged leftward also, due to plate 118 engaging flange 114 at opening 120. Thus, stem 20 is repeatedly moved leftward with respect to the radially expandable rings 22.

Figure 7:
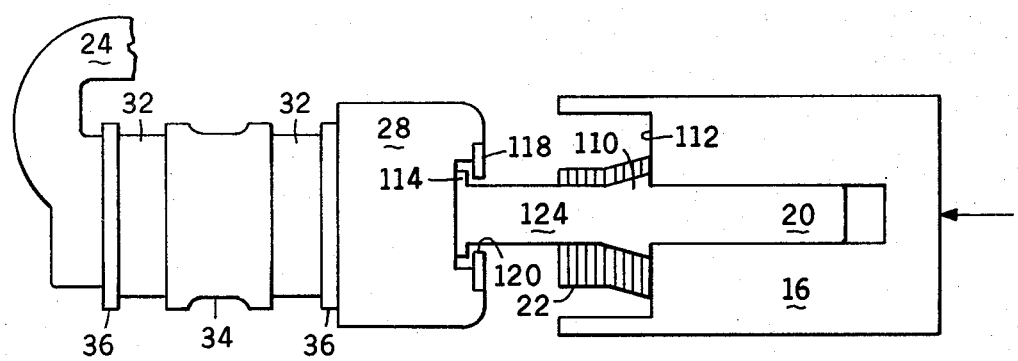
FIGS. 7, 8 and 9 are graphical representations illustrating interrelation of the rings, the adjusting stem and the actuating piston with an associated caliper disc brake as the brake pad linings progressively wear away.
Figure 8:
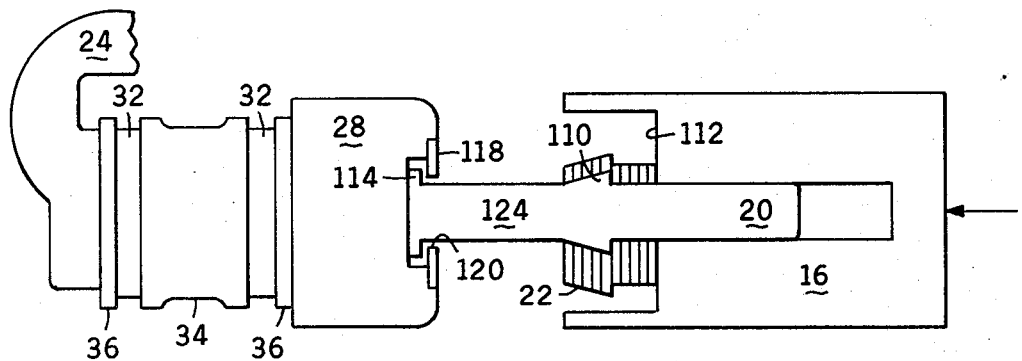
Figure 9:
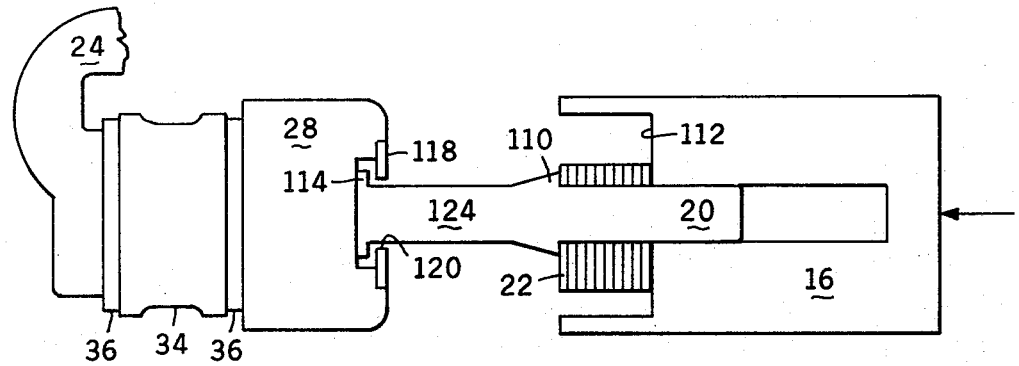

As the braking engagements are repeated, linings 32 gradually wear away (see FIGS. 7, 8 and 9). As linings 32 wear away, stem 20 moves leftward with increasing relation to rings 22.

Stem 20 extends through rings 22 and radial extensions 94, 96 of the rings extend radially into slots 90, 92, respectively (see FIGS. 4 and 7). As sufficient wear occurs due to repeated braking action, the relative movement of stem 20 through the stack of rings 22 will urge shoulder 110 through the stack causing the rings to sequentially expand as the shoulder passes through the stack (see FIGS. 5 and 8). After the shoulder passes through the stack the rings return to their original non-expanded position between shoulder 110 and land 112 of piston 16. The relative movement of stem 20 with respect to piston 16, urges rings over shoulder 110 so that piston 16 and shoulder 110 are progressively axially spaced by a number of rings 22 whose thickness is comparable to the amount of wear on linings 32 (see FIG. 8). Also, as rings 22 expand over shoulder 110 extensions 94, 96 move within the limits of slots 90, 92 (see FIG. 5).

When the parking brake is set, actuation of lever 18 causes the lever to pivot about the centroidal axis of pin 58. Lever portion 106 applies a force to piston 16 at groove 84 to move piston 16 linearly relative to housing 14. The force is received by stem 20 where first portion or shoulder 110 is engaged by the piston land 112 (see FIG. 7). However, as the stem is displaced with respect to piston 16 due to wear of linings 32, land 112 engages the rings 22 which become sequentially disposed between land 112 and shoulder 110. The piston and the stem then move as a unit. Intermediate portion 124 then transmits that force to second portion 114 whereupon the second portion applies the force to piston 28 which, as is well known, ultimately urges brake pad linings 32 into braking engagement with disc 34. After the force is removed from piston 16, spring 76 returns piston 16 to its original position relative to housing 14 (see FIG. 1). In this manner, piston 16 can move relative to stem 20. Thus retainer ring 98 and washer 104 urge the stacked rings 22 along intermediate portion 124 of stem 20.

A preselected number of rings 22 may be provided so that the thickness of the stack corresponds to the thickness of pad linings 32, FIG. 9. As the shoulder portion 110 progressively passes through rings 22, adjustment for wear is accomplished in that stem 20 is gradually axially displaced relative to piston 16. In this manner, piston 16 and lever 18 retain substantially the same relative positions for repeated braking applications although the linings 32 are gradually being worn away (see FIGS. 7, 8 and 9). Thus, subsequent parking brake forces applied to piston 16 will be transmitted to shoulder 110 through the rings which axially displace stem 20 relative to piston 16.

When new linings 32 are placed on shoes 36 the rings 22 may be returned to their original position as shown in FIG. 1 and 7. This is accomplished by removing lever 18 from slot 84 of piston 16. A tool can then be inserted into slot 84 and piston 16 can be rotated so that extension 96 abuts key 130, FIG. 6. Portion 140 of piston 16 separates slots 90, 92. Portion 140 engages extension 94 upon rotation of piston 16 and expands rings 22 within the tolerances permitted by slots 90, 92. Since extension 96 is limited in rotation due to its abutting engagement with key 130, the stack of rings 22 may be simultaneously radially expanded for clearance of shoulder 110. Thus the entire stack of rings 22 may be moved from the position shown in FIG. 9 to the position shown in FIG. 7.

The foregoing has described a parking brake including wear adjustment means which provides gradual wear adjustment and which may be reset without the need for substantial disassembly of the parking brake assembly.

Obviously, many modifications and variations of the present invention are possible in the light of the above teachings. It is, therefore, to be understood that within the scope of the appended claims the invention may be practiced otherwise than as specifically described.

What is claimed is:

1. In a caliper disc brake assembly of the type including a hydraulically actuated piston wherein the piston is slidable in a caliper bore and is actuated upon introduction of hydraulic fluid pressure forces to urge the piston and associated brake pad assembly into braking engagement with the disc, the improvement comprising:

an outer housing mounted on the caliper;

an actuating piston movably mounted within the outer housing for movement relative thereto;

actuating means mounted on the outer housing to engage the actuating piston and to apply a force thereto to move the piston relative to the housing;

an adjusting stem mounted within the actuating piston and provided to receive the force applied to the actuating piston by the actuating means and to transmit that force to the piston slidable in the caliper bore to urge the brake pad assembly into braking engagement with the disc;

a plurality of radially independently expandable means provided within the actuating piston for compensating for wear resulting from repeated braking engagement of the brake pad assembly and the disc; and a single radially outwardly extending shoulder portion annularly disposed about the stem and intermediately of the length of the stem for engaging the radially expandable means.

2. In a caliper disc brake assembly of the type including a hydraulically actuated piston wherein the piston is slidable in a caliper bore and is actuated upon introduction of hydraulic fluid pressure forces to urge the piston and associated brake pad assembly into braking engagement with the disc, the improvement comprising:

an outer housing mounted on the caliper;

an actuating piston movable mounted within the outer housing for relative movement therewith;

actuating means mounted on the outer housing for relative movement therewith to engage the actuating piston and to apply a force thereto to move the piston linearly relative to the housing;

an adjusting stem mounted within the actuating piston and provided to receive the force applied to the actuating piston and to transmit that force to the piston slidable in the caliper bore and to urge the brake pad assembly into braking engagement with the disc;

a plurality of radially independently expandable rings in relatively stacked relationship provided within the actuating piston forming a passageway therethrough for accommodating the adjusting stem and for compensating for wear resulting from repeated braking engagement of the brake pad assembly and the disc; and a single radially outwardly extending shoulder portion annularly disposed about the stem and intermediately of the length of the stem for engaging the radially expandable rings.

3. In a caliper disc brake assembly of the type including a hydraulically actuated piston wherein the piston is slidable in a caliper bore and is actuated upon introduction of hydraulic fluid pressure forces to urge the piston and associated brake pad assembly into braking engagement with the disc, the improvement comprising:

an outer housing mounted on and externally of the caliper bore;
an actuating piston movably mounted within the outer housing for relative movement therewith;
actuating means mounted on the outer housing for relative movement therewith to engage the actuating piston and to apply a force thereto to move the piston linearly relative to the housing;
an adjusting stem including:
a first portion mounted within the actuating piston and provided to receive the force applied to the actuating piston by the actuating means;
a second portion extending into the caliper bore and engaging the hydraulically actuated piston slidable therein;
an intermediate portion interconnecting the first and second portions for transmitting the force applied to the first portion to the second portion whereby the second portion applies the force to the piston slidable in the caliper bore to urge the brake pad assembly into braking engagement with the disc;
a plurality of radially independently expandable means provided within the actuating piston for compensating for wear resulting from repeated braking engagement of the brake pad assembly and the disc; and
a single radially outwardly extending shoulder portion annularly disposed about the stem at the first portion thereof for engaging the radially expandable means.

4. The disc brake assembly of claim 1, wherein the adjusting stem comprises an elongated member having the radially outwardly extending shoulder portion thereon for receiving the force applied to the actuating piston by the actuating means.

5. The disc brake assembly of claim 4, wherein the means provided within the actuating piston for compensating for wear comprises a plurality of radially expandable rings in relatively stacked relationship provided within the actuating piston forming a passageway therethrough for accommodating the adjusting stem.

6. The disc brake assembly of claim 5, wherein the rings comprise an open ring portion substantially resilient for radial expansion thereof and including a first terminal extension extending radially outwardly from the open ring portion and a second terminal extension radially spaced from the first extension and extending radially outwardly from the open ring portion a greater distance than the first extension.

7. The disc brake assembly of claim 6, wherein:
the actuating piston includes a first bore formed therein for receiving a portion of the adjusting stem and also includes a second bore formed therein for receiving the stacked plurality of rings therein, the stacked rings providing a passageway formed therethrough for accommodating the adjusting stem, the actuating piston further including first and second radially spaced slots extending radially outwardly from the second bore and terminating externally of the actuating piston and extending axially along the length of the second bore for receiving the first and second terminal extensions, respectively, of the stacked rings.

8. The disc brake assembly of claim 7, wherein the outer housing includes a key fixedly mounted therein for abutment with the second terminal extension of the rings.

9. The disc brake assembly of claim 8, wherein the actuating piston is rotatable relative to the outer housing for radially expanding the rings when the second terminal extension abuts the key and the first terminal extension engages the first groove for relative rotation therewith.

10. The disc brake assembly of claim 3, wherein the means provided within the actuating piston for compensating for wear comprises a plurality of rings in relatively stacked relationship provided within the actuating piston forming a passageway therethrough for slidingly accommodating the intermediate portion of the adjusting stem.

11. The disc brake assembly of claim 10, wherein the adjusting stem first portion comprises the radially outwardly extending shoulder portion thereon for receiving the force applied to the actuating piston by the actuating means.

12. The disc brake assembly of claim 11, wherein the rings are substantially resilient for radial expansion thereof to permit the shoulder portion of the adjusting stem to pass through the passageway formed by the stack of rings whereby the adjusting stem is axially displaced relative to the actuating piston.

13. A parking brake including a wear compensating device for a disc brake assembly comprising:
an outer housing adapted for mounting on a disc brake assembly;
an actuating piston movably mounted within the outer housing for relative movement therewith;
actuating means mounted on the outer housing for relative movement therewith to engage the actuating piston and to apply force thereto to move the piston relative to the housing;
an adjusting stem mounted within the actuating piston and provided to receive the force applied to the actuating piston by the actuating means and to transmit that force to the disc brake assembly;
a plurality of radially independently expandable rings in relatively stacked relationship provided within the actuating piston forming a passageway therethrough for accommodating the adjusting stem and for compensating for wear resulting from use of the disc brake assembly by permitting axial displacement of the adjusting stem relative to the actuating piston; and
a single radially outwardly extending shoulder portion annularly disposed about the stem and intermediately of the length of the stem for engaging the radially expandable rings.

14. A parking brake including a wear compensating device for a disc brake assembly comprising:

an outer housing adapted for mounting on a disc brake assembly;

an actuating piston movably mounted within the outer housing for relative movement therewith;

actuating means mounted on the outer housing for relative movement therewith to engage the actuating piston and to apply a force thereto to move the piston linearly relative to the housing;

an adjusting stem including;

a first portion mounted within the actuating piston and provided to receive the force applied to the actuating piston by the actuating means;

a second portion extending into the disc brake assembly for engagement therewith;

an intermediate portion interconnecting the first and second portions for transmitting the force applied to the first portion to the second portion whereby the second portion applies the force to the disc brake assembly to actuate the assembly for a braking operation;

a plurality of radially independently expandable means provided within the actuating piston for compensating for wear resulting from repeated braking operations of the disc brake assembly; and a single radially outwardly extending shoulder portion annularly disposed about the stem at the first portion thereof for engaging the radially expandable means.

15. The parking brake of claim 14, wherein the means provided within the actuating piston for compensating for wear comprises a plurality of rings in relatively stacked relationship provided within the actuating piston forming a passageway therethrough for slidingly accommodating the intermediate portion of the adjusting stem.

16. The parking brake of claim 15, wherein the adjusting stem first portion comprises the radially outwardly extending shoulder portion thereon for receiving the force applied to the actuating piston by the actuating means.

17. The parking brake of claim 16, wherein the rings are substantially resilient for radial expansion thereof to permit the shoulder portion of the adjusting stem to pass through the passageway formed by the stack of rings whereby the adjusting stem is axially displaced relative to the actuating piston.

18. In a caliper disc brake assembly of the type including a hydraulically actuated piston wherein the piston is slidable in a caliper bore and is actuated upon introduction of hydraulic fluid pressure forces to urge the piston and associated brake pad assembly into braking engagement with the disc, the improvement comprising:

an outer housing mounted on the caliper;

an actuating piston movably mounted within the outer housing for relative movement therewith;

actuating means mounted on the outer housing for relative movement therewith to engage the actuating piston and to apply a force thereto to move the piston linearly relative to the housing;

an adjusting stem mounted within the actuating piston and provided to receive the force applied to the actuating piston and to transmit that force to the piston slidable in the caliper bore and to urge the brake pad assembly into braking engagement with the disc; and a plurality of radially independently expandable rings in relatively stacked relationship provided within the actuating piston forming a passageway therethrough for accommodating the adjusting stem and for compensating for wear resulting from repeated braking engagement of the brake pad assembly and the disc;

a single radially outwardly extending shoulder portion annularly disposed about the stem and intermediately of the length of the stem for engaging the radially expandable rings and for receiving the force applied to the actuating piston;

the rings comprising an open ring portion substantially resilient for radial expansion thereof and including a first terminal extension extending radially outwardly from the open ring portion and a second terminal extension radially spaced from the first extension and extending radially outwardly from the open ring portion a greater distance than the first extension;

a first bore formed in the actuating piston for receiving a portion of the adjusting stem;

a second bore formed in the actuating piston for receiving the stacked plurality of rings therein, first and second radially spaced slots in the actuating piston, the slots extending radially outwardly from the second bore and terminating externally of the actuating piston and extending axially along the length of the second bore for receiving the first and second terminal extensions, respectively, of the stacked rings;

a key fixedly mounted in the outer housing for abutment with the second terminal extension of the rings; and the actuating piston being rotatable relative to the outer housing for radially expanding the rings when the second terminal extension abuts the key and the first terminal extension engages the first groove for relative rotation therewith.

* * * * *